No. 12,784. REISSUED APR. 21, 1908.

C. F. JACOBS.

PROCESS FOR UNITING METAL PIECES.

APPLICATION FILED OCT. 31, 1907.

WITNESSES:

Geo. D. Perry

U. P. Kilroy

INVENTOR

Charles F. Jacobs

By Cheever & Cox

ATTORNEYS

UNITED STATES PATENT OFFICE.

CHARLES F. JACOBS, OF CHICAGO, ILLINOIS, ASSIGNOR TO JACOBS WELDING COMPANY, OF CHICAGO, ILLINOIS, A CORPORATION OF ILLINOIS.

PROCESS FOR UNITING METAL PIECES.

No. 12,784. Specification of Reissued Letters Patent. Reissued Apr. 21, 1908.

Original No. 825,541, dated July 10, 1906, Serial No. 326,822. Application for reissue filed October 31, 1907. Serial No. 398,127.

*To all whom it may concern:*

Be it known that I, CHARLES F. JACOBS, a citizen of the United States, residing at Chicago, in the county of Cook and State of Illinois, have invented certain new and useful Improvements in Processes for Uniting Metal Pieces, of which the following is a specification.

This invention relates to improvements in a process for joining or uniting metal pieces, and while it is more especially intended for use in joining the rails of electric railways, so as to render them practically continuous and adaptable for transmission of electric currents, yet it is applicable for uniting rails or metallic pieces employed for other purposes; and it consists in certain novel features and steps practiced in carrying out the process.

The principal object of the invention is to provide a simple, inexpensive, and efficient method for joining metallic pieces by the use of which when used for joining railway-rails a continuous rail with perfect and permanent electric conductivity will be afforded at a great saving in time, labor and expense.

In carrying out the process it will be understood that any suitable apparatus may be employed for holding the pieces of metal with their ends approximated, so as to receive the uniting material therebetween, and for connecting the electric conductors to the pieces of metal, and in the accompanying drawings I have shown one form of such devices; but I do not desire to be limited thereto, as they may be varied; but to facilitate the explanation of the process, so that it may be more easily and thoroughly understood, it is deemed necessary to illustrate one form thereof.

In order to enable others skilled in the art to which my invention pertains to make and use the same, I will now proceed to describe it, referring to the accompanying drawings, in which—

Figure 1:
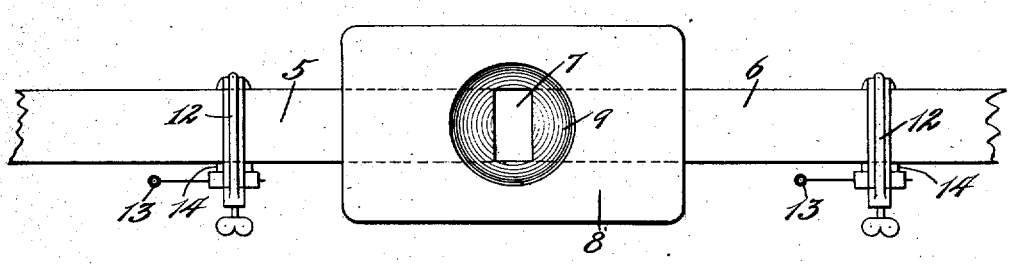
Figure 2:
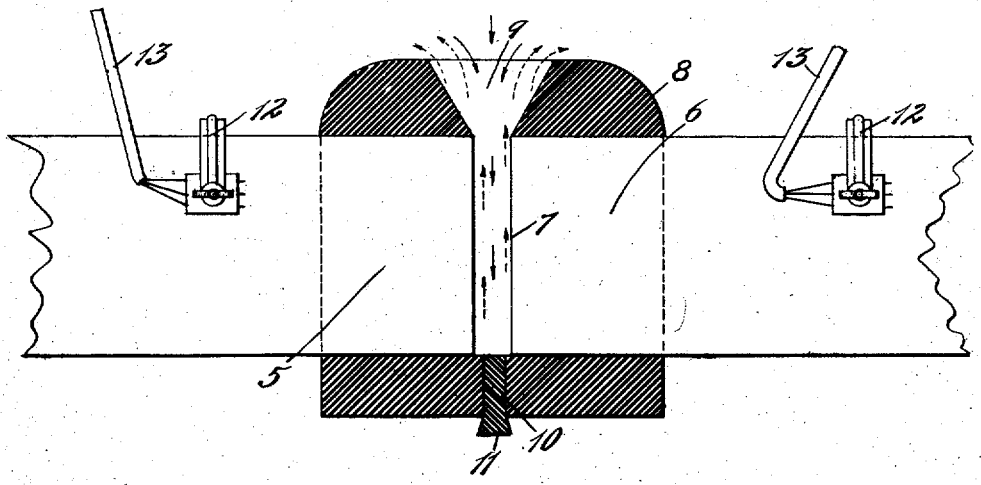

Figure 1 is a plan view of two pieces of metal, showing their ends approximated and embraced by an apertured form or mold and illustrating an electric conductor clamped to each of said pieces; and Fig. 2 is a side view thereof, partly in section and partly in elevation.

Like numerals of reference refer to corresponding parts throughout both views of the drawings.

The reference-numerals 5 and 6 designate two pieces of metal, which may be railway-rails or metallic pieces used for other purposes and which have their ends approximated, so as to leave a space 7 therebetween. Placed around the adjacent portions of the pieces 5 and 6 is a form or mold 8, which may be of any suitable material and is provided in its upper end with an opening 9, which is preferably funnel-shaped or tapered, as shown, to communicate with the space 7 between the metallic pieces, so as to convey the molten material used in the process thereto. The lower portion of the form 8 may also be provided with an opening 10 for the discharge or withdrawal of the flux, and said opening may be closed by means of a plug 11 of any suitable refractory material.

Detachably secured to each of the pieces of metal by means of a screw-clamp 12, or otherwise, is an electric conductor 13, each of which lead from a source of electric supply and have their ends electrically connected to an electrode 14, carried by each of the screw-clamps 12, as will be readily understood by reference to the drawings. While I have shown the conductors 13 as being held in electric connection with the pieces 5 and 6 by means of the clamps 12, yet it is apparent that they may be connected thereto by other suitable means. When the adjacent portions of the rails or pieces 5 and 6 have been surrounded or embraced by the form or mold 8, a substance which when cold is substantially a non-conductor and when molten is a conductor is introduced into the space 7 through the opening 9 in the form. This substance is preferably a flux in molten condition. The electric current is turned on through the conductors 13, when by reason of the resistance of the flux the ends of the rails or pieces 5 and 6 will become heated to a suitable degree, when by removing the plug 11 from the opening 10 the flux will be discharged through said opening and the space 7 filled with molten metal after the plug 11 has been replaced in said opening. Instead of using the plugged opening 10 for the discharge of the flux the molten metal may be poured through the opening 9 of the form 8 into the space 7, which by reason of its greater specific gravity will force the flux upwardly and out through the opening 9, as indicated by the dotted arrows shown in Fig. 2 of the drawings, and this mode of removing the flux will usually be practiced.

By practical tests and experiments I have found that a flux consisting of about twenty-five per cent. (25%) of each of the following named ingredients—to wit, borax, fluor-spar, zinc chlorid, and sodium chlorid—is especially well adapted for use in my process, yet I do not desire to be limited to the use of said composition, nor do I desire to be limited to the exact proportions of each ingredient above named, for in some instances I may omit one or more of the ingredients or may vary the proportions thereof or I may employ a flux or an electrolyte composed of other ingredients without departing from the spirit of my invention. In practicing the process the electric current is turned off immediately before the molten metal is placed between the ends of the metallic pieces.

It will be understood that the heat which the pieces 5 and 6 require is derived from the flux, and the heat of the flux is due almost entirely to the electric current passing through it, the flux, even when in a molten state offering a considerable resistance to the passage of the current and consequently generating heat. As the flux is practically a non-conductor when cold, it is necessary that it shall be molten or substantially so before there will be a sufficient passage of current to raise the pieces to the required temperature. For practical reasons it is preferable that the flux be in molten condition at the time it is introduced.

Having thus fully described my invention, what I claim as new, and desire to secure by Letters Patent, is:

1. The process of uniting metal pieces consisting in bringing the pieces to be united near together but not in actual contact, introducing molten flux between said pieces, passing an electric current through said flux from one of said pieces to the other, and finally replacing said flux with molten metal.

2. The process of uniting metal pieces consisting in bringing the pieces to be united near together but not in actual contact, inserting between said pieces a fusible flux which when cold is substantially a non conductor, and when fused is a conductor, passing an electric current from one of said pieces to the other through said flux, and finally replacing said flux with molten metal.

3. The herein described process of uniting metal pieces which consists in securing a form around the adjacent portions of the metallic pieces, placing a flux in the space between the ends of said pieces, passing an electric current through said flux from one of said pieces to the other to thereby raise said pieces to the required temperature, and replacing the flux by molten metal.

4. The herein described process of uniting metal pieces which consists in securing the ends of the pieces by placing an apertured form around the same, placing fusible flux in the space between the ends of said pieces, passing an electric current from one of said pieces to the other through said flux, removing the flux through one of the apertures of the form, and filling the space between the ends of the metal pieces with molten metal.

5. The herein described process of uniting metal pieces which consists in securing the ends of the pieces by placing an apertured form around the same, placing molten flux in the space between the ends of said pieces, passing an electric current from one of said pieces to the other through said flux, removing the flux through one of the apertures of the form, and filling the space between the ends of the metal pieces with molten metal.

6. The herein described process of uniting metal pieces which consists in securing the approximated ends of the pieces by means of an apertured form, placing molten flux consisting of borax, fluor-spar, zinc chlorid and sodium chlorid in about the quantity specified, in the space between the ends of said pieces, passing an electric current through said flux and replacing the flux with molten metal.

7. The herein described process of uniting metal pieces which consists in securing a form on the adjacent portions of the metallic pieces, placing molten flux in the space between the ends of said pieces, passing an electric current from one of said pieces to the other through said molten flux in quantities sufficient to heat the approximated ends of said pieces to the required temperature, then turning off the current and replacing the flux with molten metal.

8. The herein described process of uniting metal pieces which consists in heating the metal pieces to be united by means of flux and an electric current, and then pouring molten metal between said pieces.

CHARLES F. JACOBS.

Witnesses:
C. J. CHRISTOFFEL,
HOWARD M. COX.